(12) United States Patent
James et al.

(10) Patent No.: US 7,617,585 B2
(45) Date of Patent: Nov. 17, 2009

(54) CLAMP BLOCK ASSEMBLIES AND METHODS

(75) Inventors: Jeremy R. W. James, Wichita, KS (US); Lance A Cutler, Maize, KS (US)

(73) Assignee: The Boeing Company, Chicago, IL (US)

( * ) Notice: Subject to any disclaimer, the term of this patent is extended or adjusted under 35 U.S.C. 154(b) by 87 days.

(21) Appl. No.: 12/112,951

(22) Filed: Apr. 30, 2008

(65) Prior Publication Data

US 2008/0203728 A1 Aug. 28, 2008

Related U.S. Application Data

(63) Continuation of application No. 10/956,001, filed on Sep. 30, 2004, now Pat. No. 7,380,754.

(51) Int. Cl.
*B23P 11/00* (2006.01)
*F16L 25/00* (2006.01)
(52) U.S. Cl. .................................. 29/525.01; 285/420
(58) Field of Classification Search .............. 29/525.01, 29/525.02, 428, 559, 781, 237; 285/367, 285/420, 23, 406, 242, 248, 411, 413, 415, 285/217; 244/135 R, 135 A
See application file for complete search history.

(56) References Cited

U.S. PATENT DOCUMENTS

| | | | |
|---|---|---|---|
| 3,297,383 A | 1/1967 | Fay | |
| 5,080,400 A * | 1/1992 | Adamek et al. | 285/23 |
| 5,188,397 A | 2/1993 | Hynes | |
| 5,246,143 A | 9/1993 | Cherfane | |
| 5,573,206 A * | 11/1996 | Ward | 244/135 A |
| 5,996,939 A * | 12/1999 | Higgs et al. | 244/135 A |
| 6,315,335 B1 | 11/2001 | Seedorff | |
| 6,367,849 B1 | 4/2002 | Tatsuta et al. | |
| 6,520,710 B2 | 2/2003 | Wells | |
| 7,036,770 B2 | 5/2006 | Shelly et al. | |
| 7,090,259 B2 * | 8/2006 | Dole | 285/367 |
| 7,111,876 B2 | 9/2006 | Hayashi et al. | |

* cited by examiner

*Primary Examiner*—John C Hong
(74) *Attorney, Agent, or Firm*—Lee & Hayes, PLLC

(57) ABSTRACT

Clamping devices and methods for supporting pipes that experience biaxial loading forces are provided. The clamping device transmits forces from the pipe to surrounding supporting frame structure. In one embodiment, a clamp apparatus includes a first piece having first and second staggered notches and a second piece having first and second staggered notches. The first and second pieces are placed in contact with each other with the first staggered notches of the first and second pieces contacting each other and the second staggered notches of the first and second pieces contacting each other. The clamp apparatus forms a cavity for receiving a pipe.

5 Claims, 2 Drawing Sheets

CLAMP BLOCK ASSEMBLIES AND METHODS

RELATED APPLICATIONS

This application is a Continuation of and claims priority to U.S. patent application Ser. No. 10/956,001, filed Sep. 30, 2004, which is incorporated herein by reference.

GOVERNMENT LICENSE RIGHTS

This invention was made with Government support under U.S. Government contract F33657-98-D-0002 awarded by the Air Force. The Government has certain rights in this invention.

FIELD OF THE INVENTION

This invention relates generally to structural support devices and, more specifically, to support devices for pipes that experience loads.

BACKGROUND OF THE INVENTION

Pipes that transport high pressure, high quantity amounts of fluid must be properly supported in the environment in which they are used. For example, a re-fueling aircraft, such as MC-130H Combat Talon II or a KC-10, includes a re-fueling system that drives large amounts of fuel through the pipes to re-fueling drapes. Presently, the pipes of the re-fueling system are supported by standard C-clamps that attach the pipe to surrounding aircraft frame structure. Biaxial loads occur in the pipes at joints of the pipe. The present clamping system limits biaxial movement of the pipes new the joint locations. Also, biaxial loads are experienced by the pipes themselves with little transfer of the loading forces to the surrounding frame structure occurs.

Therefore, there exists a need to install pipe supports that transfer biaxial loading forces away from the pipe and to surrounding supporting frame structure. Also, there exists a need to support pipes of fuel lines without experiencing any deterioration due to fuel contamination.

SUMMARY

The present invention provides clamping devices and methods for supporting pipes that experience biaxial loading forces. The clamping device transmits forces from the pipe to surrounding supporting frame structure. In one embodiment, a clamp apparatus includes a first piece having first and second staggered notches and a second piece having first and second staggered notches. The first and second pieces are placed in contact with each other with the first staggered notches of the first and second pieces contacting each other and the second staggered notches of the first and second pieces contacting each other. The clamp apparatus forms a cavity for receiving a pipe.

In accordance with further aspects of the invention, the first and second pieces are bolted together and attached to a frame stricture with flange.

In accordance with another aspect of the invention, the frame structure includes second and third flanges that are substantially perpendicular to the first flange.

In accordance with yet another aspect of the invention, a support material is attached to walls of the first and second pieces that form the pipe receiving cavity. The support material includes a rubberized cork material, such as butyl-N rubber.

BRIEF DESCRIPTION OF THE DRAWINGS

Preferred and alternate embodiments of the present invention are described in detail below with reference to the following drawings.

DETAILED DESCRIPTION

The present invention relates to support assemblies and methods. Many specific details of certain embodiments of the invention are set forth in the following description and in FIGS. 1-6 to provide a thorough understanding of such embodiments. One skilled in the art, however, will understand that the present invention may have additional embodiments, or that the present invention may be practiced without several of the details described in the following description.

Figure 1:
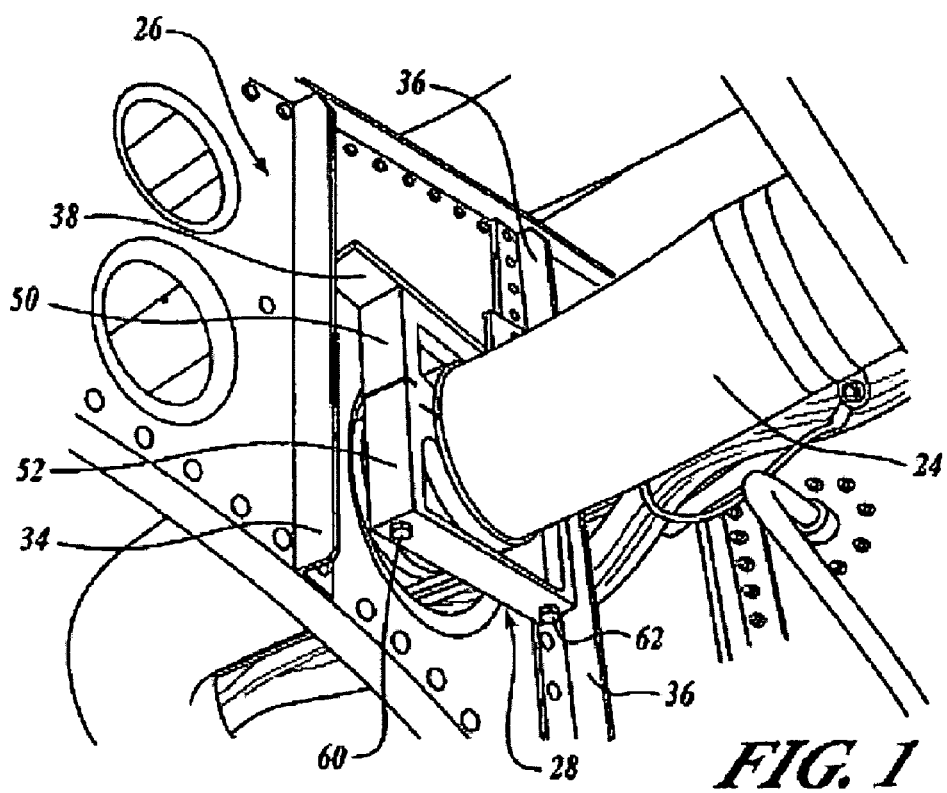
FIGS. 1 and 2 are perspective views of a clamp block assembly formed in accordance with an embodiment of the present invention.
Figure 2:
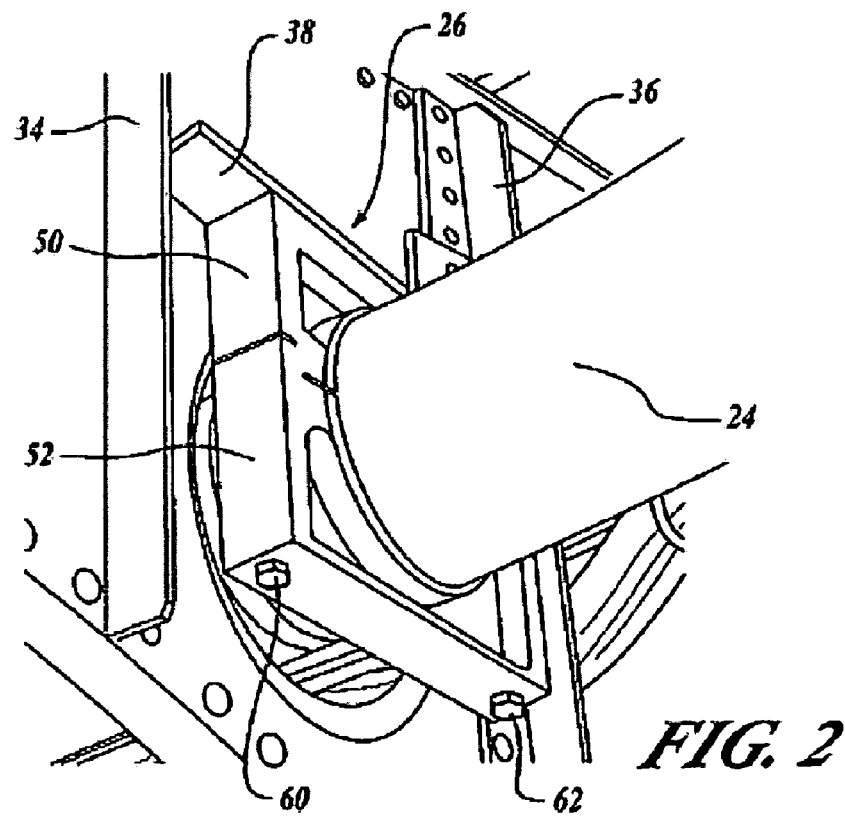
Figure 3:
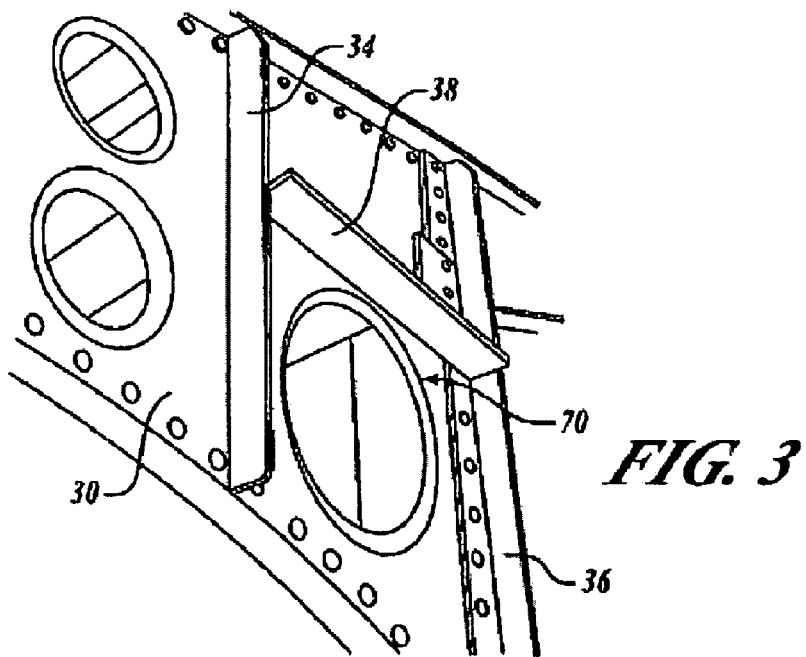
FIG. 3 is a perspective view of a mounting structure formed in accordance with an embodiment of the present invention.

As shown in FIGS. 1 and 2, a pipe 24 is supported after a bend in the pipe 24 by a clamp assembly 26. The clamp assembly 26 includes a clamp block assembly 28 attached to a structural support 38. The clamp block assembly 28 includes a first section 50 and a second section 52 that are attached to a first structural support 38 by bolts 60 and 62 that pass through the sections 50 and 52. The clamp assembly 26 includes second and third structural supports 34 and 36 that attach to existing frame structural supports, which are structural supports of an aircraft in one embodiment, and to the first structural support 38. The second and third structural supports 34 and 36 include flanges that provide additional structural support. The first structural support 38 also includes a flange that is approximately perpendicular to the flanges of the second and third structural supports 34 and 36. The clamp block assembly 28 supports the pipe 24 as it passes through an opening 70 located between the first and second structural supports 34 and 36, as shown in FIG. 3.

Figure 4:
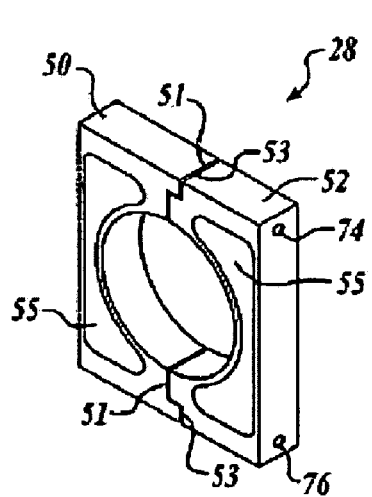
FIG. 4 is a perspective view of the clamp block assembly shown in FIGS. 1 and 2.
Figure 5:
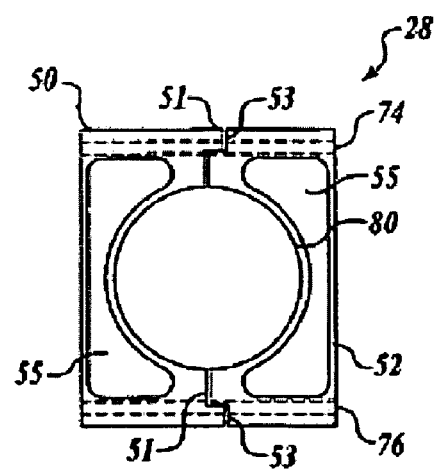
FIG. 5 illustrates a side view of the clamp block assembly of FIG. 4.

Referring to FIGS. 4 and 5, the adjoining, connecting edges of the first and second sections 50 and 52 that come in contact with each other are "stepped" or include "staggered notches". In one embodiment, the connecting edges 51 of the first section 50 steps up a unit amount when progressing from the center of the circular hole formed by the clamp block assembly 28 and progressing radially out from that center point. The connecting edges 53 of the second section 52 steps down when traveling from the center point of the hole radially outward therefrom.

In one embodiment, the sections 50 and 52 included hollowed out regions 55 on each lateral side, thereby reducing the overall weight of the sections 50 and 52. The staggered notches of the connecting edges 51, 53 transmit side loads of a pipe received by the clamp block assembly 28 through the sections 50 and 52 and thus through the attached first structural support 38 and other attached support structural supports 34 and 36. In one embodiment, the pieces 50 and 52 are machined from aluminum blocks and include machined holes 74 and 76 that pass through outer edges of the sections 50 and 52 through the staggered notches.

Referring to FIGS. 1 and 2, the bolts 60 and 62 pass through the holes 74 and 76 (FIG. 4) and are bolted to the flange of the structural support 38. Other attachment devices may be used to attach the clamp block assembly 28 to the flange of the structural support 38 or may be added to complement the bolts 60 and 62, such as an adhesive.

As shown in FIG. 5, included along the inner circular edge that forms the circular cavity of the clamp block assembly 28 is a fuel resistant and friction absorbing component 80. Examples of the component 80 include a rubberized fuel resistant cork such as butyl-N rubber. The component 80 is bonded to the inner circular edge of the sections 50 and 52 suitably using a fuel resistant bonding agent. In other applications where the pipe 24 is not transporting high pressured fuel, then the component 80 need not be formed of a fuel resistant material nor need be bonded by a fuel resistant bonding agent. In one embodiment, the component 80 is a rubber insert such as nitrile rubber sheet. The nitrile rubber sheet is bonded using any number type of bonding agents such as those produced by QPL, 3M, and Bostik Finley. Examples of nitrile rubber sheets are available from Aero® Rubber Company.

Figure 6:
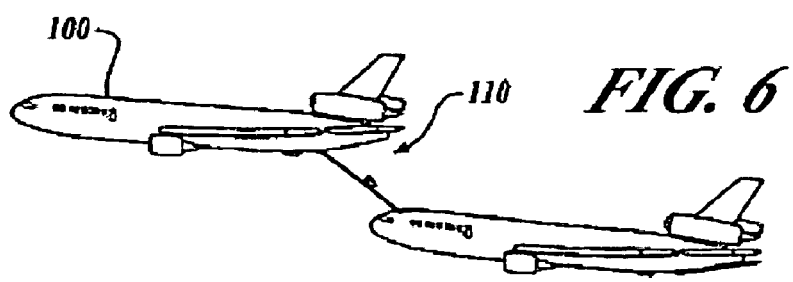
FIG. 6 is a side view of a re-fueling aircraft operating with a re-fueling system that includes clamp block assemblies shown in FIGS. 1-5.

FIG. 6 illustrates a KC-10 re-fueling aircraft 100 that include a re-fueling system 110 having one or more clamp block assemblies 28 for supporting manifold pipes. The high pressure re-fueling system 110 of the KC-10 aircraft 100 produces biaxial loading forces at or near manifolds. The clamp block assembly 28 advantageously reduces the stress that prior pipes experienced with previous clamp systems. The high pressure re-fueling system 110 may be used in other aircraft, such as a MC-130H Combat Talon II.

While preferred and alternate embodiments of the invention have been illustrated and described, as noted above, many changes can be made without departing from the spirit and scope of the invention. For example, the clamp block assembly 28 may be used in ground-based applications. Accordingly, the scope of the invention is not limited by the disclosure of these preferred and alternate embodiments. Instead, the invention should be determined entirely by reference to the claims that follow.

What is claimed is:

1. A method of securing a conduit, comprising:
   providing a first member having a pair of first engagement edges and a first arcuate edge disposed therebetween, each first engagement edge defined by first and second outer extensions and first and second inner indentations;
   providing a second member having a pair of second engagement edges and a second arcuate edge disposed therebetween, each second engagement edge defined by first and second outer indentations and first and second inner extensions, the first and second pieces being asymmetrical to each other; and
   engaging the conduit with the arcuate edge of the first member; and
   engaging the first engagement edges with the second engagement edges such that the inner extensions of the second member are matedly received within the inner indentations of the first member, the first and second members thus defining a clamp block assembly having a rectangular outer boundary, the conduit being secured between the first and second arcuate edges.

2. The method of claim 1, wherein:
   providing a first member includes providing a first member having a pair of cavities formed there through; and
   providing a second member includes providing a second member having a pair of cavities formed there through.

3. The method of claim 2, further comprising securing the first member to the second member by way of a pair of bolts received in the cavities of the first member and second member.

4. The method of claim 1, further comprising providing a support material attached to an inner portion of at least the first member or the second member.

5. The method of claim 1, further comprising securing at least the first member or the second member to a support structure.

* * * * *